(12) United States Patent
Cho

(10) Patent No.: US 12,450,026 B2
(45) Date of Patent: Oct. 21, 2025

(54) METHOD OF SUGGESTING SPEECH AND RECORDING MEDIUM

(71) Applicants: HYUNDAI MOTOR COMPANY, Seoul (KR); KIA CORPORATION, Seoul (KR)

(72) Inventor: Yoon A Cho, Gyeonggi-do (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 494 days.

(21) Appl. No.: 17/888,971

(22) Filed: Aug. 16, 2022

(65) Prior Publication Data

US 2023/0072898 A1 Mar. 9, 2023

(30) Foreign Application Priority Data

Sep. 8, 2021 (KR) .................. 10-2021-0119829

(51) Int. Cl.
*G06K 9/00* (2022.01)
*G06F 3/01* (2006.01)
*G06F 3/16* (2006.01)
*G06V 20/59* (2022.01)

(52) U.S. Cl.
CPC ............. *G06F 3/165* (2013.01); *G06F 3/013* (2013.01); *G06V 20/593* (2022.01); *G06V 20/597* (2022.01)

(58) Field of Classification Search
CPC .......... G06F 3/165; G06F 3/013; G06F 3/167; G06V 20/593; G06V 20/597; G06V 20/59; G06V 40/172
See application file for complete search history.

(56) References Cited

U.S. PATENT DOCUMENTS

| 7,949,526 | B2 | 5/2011 | Ju et al. | |
| 10,882,398 | B2 * | 1/2021 | Cordell | B60Q 9/00 |
| 2020/0082818 | A1 | 3/2020 | Koga | |
| 2021/0339759 | A1 * | 11/2021 | Fouad | B60W 50/14 |

FOREIGN PATENT DOCUMENTS

| JP | 2004050975 A | 2/2004 |
| JP | 2006273174 A | 10/2006 |
| JP | 4032492 B2 | 1/2008 |
| JP | 2020061642 A | 4/2020 |
| JP | 2020160833 A | 10/2020 |
| KR | 10-2016-0012965 A | 2/2016 |
| KR | 10-2016-0027728 A | 3/2016 |
| KR | 10-2016-0049804 A | 5/2016 |
| KR | 10-2018-0041876 A | 4/2018 |
| KR | 10-2019-0070779 A | 6/2019 |
| KR | 10-2019-0107288 A | 9/2019 |
| KR | 10-2019-0109864 A | 9/2019 |

* cited by examiner

*Primary Examiner* — Xin Jia
(74) *Attorney, Agent, or Firm* — Morgan, Lewis & Bockius LLP

(57) ABSTRACT

A method of suggesting a speech and a recording medium which may suggest an appropriate speech by determining a speech suggestion target using various information that a vehicle may obtain, includes obtaining a user image where at least one user inside the vehicle is photographed; detecting a user looking at a display inside the vehicle among the at least one user, based on the obtained user image; and determining a target user which is a target of the speech suggestion, based on a result of the detecting.

14 Claims, 11 Drawing Sheets

FIG. 6

|  | DRIVER SEAT OCCUPANT | PASSENGER SEAT OCCUPANT | LEFT REAR SEAR OCCUPANT | RIGHT REAR SEAR OCCUPANT |
|---|---|---|---|---|
| None | ○ |  |  |  |
| DRIVER SEAT OCCUPANT | ○ |  |  |  |
| DRIVER SEAT OCCUPANT & FELLOW PASSENGER | ○ |  |  |  |
| PASSENGER SEAT OCCUPANT |  | ○ |  |  |
| PASSENGER SEAT OCCUPANT & REAR SEAR OCCUPANT |  | ○ |  |  |
| LEFT REAR SEAR OCCUPANT |  |  | ○ |  |
| RIGHT REAR SEAR OCCUPANT |  |  |  | ○ |

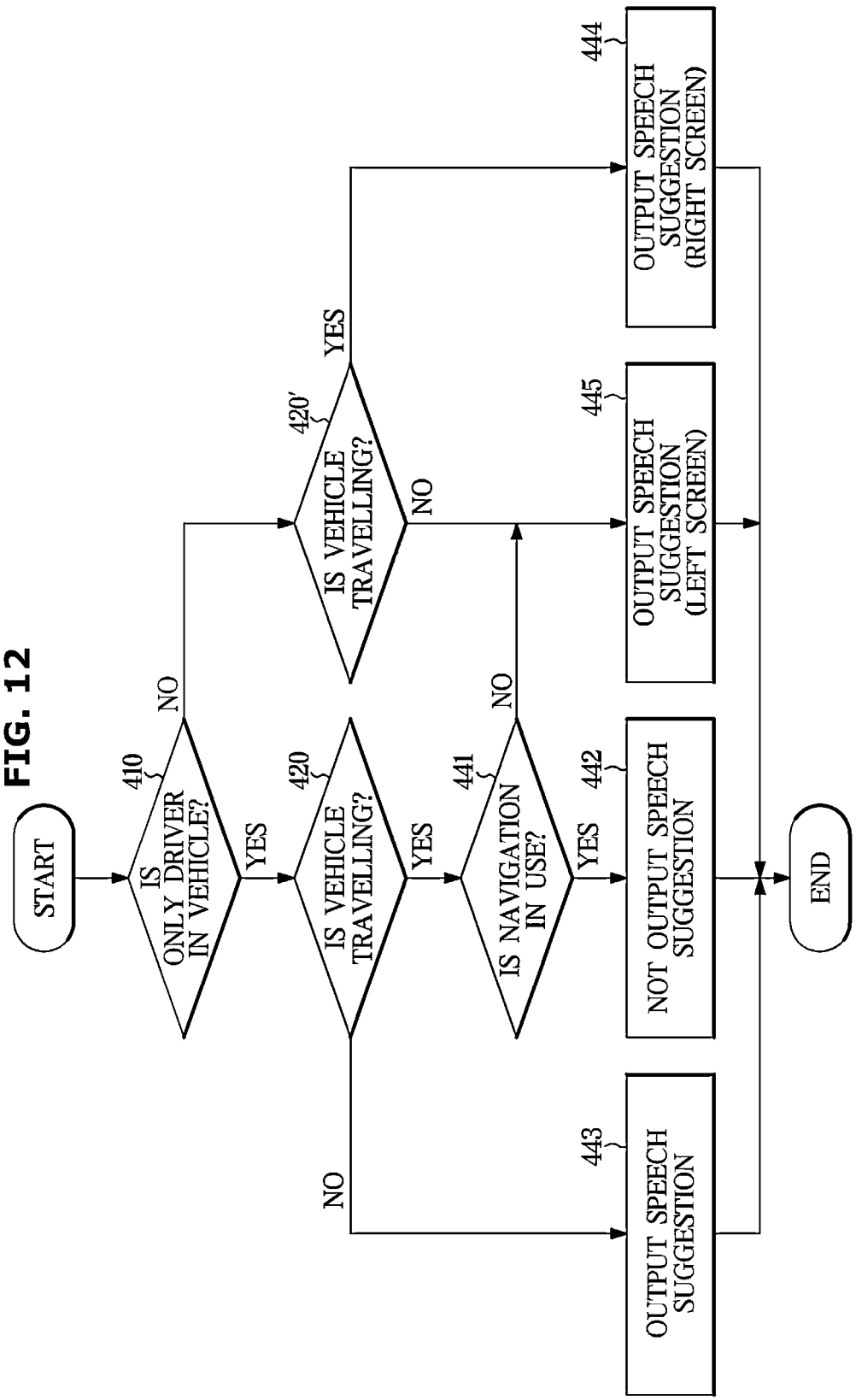

METHOD OF SUGGESTING SPEECH AND RECORDING MEDIUM

CROSS-REFERENCE TO RELATED APPLICATION

The present application claims priority to Korean Patent Application No. 10-2021-0119829, filed on Sep. 8, 2021 the entire contents of which is incorporated herein for all purposes by this reference.

BACKGROUND OF THE PRESENT DISCLOSURE

Field of the Present Disclosure

The present disclosure relates to a method of suggesting a speech to a user of a dialogue system and a recording medium in which the method is recorded.

Description of Related Art

A dialogue system is capable of identifying what is intended by a user through dialogue with the user and providing a service corresponding to the identified user intention.

Recently, because such a dialogue system is provided in a vehicle, a user may control the vehicle, obtain desired information or be provided with desired services simply by user's utterance.

Meanwhile, to use a dialogue system smoothly, a speech having content which may be understood and processed by a dialogue system is required to be input. Accordingly, a vehicle may output a speech suggestion to a user to guide a user's appropriate speech.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of suggesting a speech and a recording medium which may suggest an appropriate speech by determining a speech suggestion target using various information that a vehicle may obtain.

Also, the method of suggesting a speech and the recording medium may determine content, way of speaking, output location, etc., of the speech suggestion depending on a user determined as the speech suggestion target and a current situation, may provide a customized speech suggestion for the user and minimize an effect of speech suggestion output on driving of the vehicle.

Additional aspects of the present disclosure will be set forth in part in the description which follows, and in part, will be obvious from the description, or may be learned by practice of the present disclosure.

According to an aspect of the present disclosure, there is provided a method of suggesting a speech that provides a speech suggestion to a user inside a vehicle, the method including: obtaining a user image where at least one user inside the vehicle is photographed; detecting a user looking at a display inside the vehicle among the at least one user, based on the obtained user image; and determining a user which is a target of the speech suggestion, based on a result of the detection.

The determining of the user which is the target of the speech suggestion includes determining the user looking at the display inside the vehicle among the at least one user, as the user which is the target of the speech suggestion.

The determining of the user which is the target of the speech suggestion includes determining a driver as the user which is the target of the speech suggestion, when two or more users looking at the display inside the vehicle exist among the at least one user and the driver is included in the two or more users.

The determining of the user which is the target of the speech suggestion includes determining a driver as the user which is the target of the speech suggestion, when the user looking at the display inside the vehicle does not exist.

When a first user is determined as the user which is the target of the speech suggestion among the at least one user, and then the user looking at the display is changed from the first user to a second user, the determining of the user which is the target of the speech suggestion includes changing the user which is the target of the speech suggestion to the second user, when the change is maintained for more than a predetermined time period.

The method of suggesting a speech may further include determining a speech suggestion corresponding to the user determined as the target of the speech suggestion.

The determining of the speech suggestion includes determining at least one of content, a way of speaking, and an output location of the speech suggestion to correspond to the user determined as the target of the speech suggestion.

The determining of the speech suggestion includes determining the output location of the speech suggestion to correspond to a seating location of the user determined as the target of the speech suggestion.

The determining of the speech suggestion includes determining at least one of the content and the way of speaking of the speech suggestion to correspond to at least one of an age and a gender of the user determined as the target of the speech suggestion.

The method of suggesting a speech may further include storing a preference related to at least one of the content and the way of speaking of the speech suggestion for each user, wherein the determining of the speech suggestion includes: identifying the user determined as the target of the speech suggestion; and determining at least one of the content and the way of speaking of the speech suggestion, based on the stored preference of the identified user.

The determining of the speech suggestion includes: identifying the user determined as the target of the speech suggestion; and determining the content of the speech suggestion based on a vehicle-related knowledge level of the identified user.

The method of suggesting a speech may further include storing a speech history or a driving history for each user; and determining the vehicle-related knowledge level based on the stored speech history or driving history.

According to another aspect of the present disclosure, there is provided a method of suggesting a speech that outputs a speech suggestion to a user inside a vehicle, the method including: determining a seating location of at least one user inside the vehicle; determining whether the vehicle is travelling; and determining a user which is a target of the speech suggestion among the at least one user, based on the determined seating location and the determination on whether the vehicle is travelling.

The determining of the user which is the target of the speech suggestion includes determining a user in a driver's seat as the user which is the target of the speech suggestion, when the driver's seat is included in the determined seating location and the vehicle is at a standstill.

The determining of the user which is the target of the speech suggestion includes determining a user in a passenger seat as the user which is the target of the speech suggestion, when a driver's seat and the passenger seat are included in the determined seating location and the vehicle is travelling.

When the user in the driver's seat is determined as the user which is the target of the speech suggestion, the method of suggesting a speech may further include outputting the speech suggestion on a screen adjacent to the driver's seat in a display inside the vehicle.

When the user in the passenger seat is determined as the user which is the target of the speech suggestion, the method of suggesting a speech may further include outputting the speech suggestion on a screen adjacent to the passenger seat in a display inside the vehicle.

A computer-readable recording medium storing a program for implementing a method of suggesting a speech, the method including: obtaining a user image where at least one user inside the vehicle is photographed; detecting a user looking at a display inside the vehicle among the at least one user, based on the obtained user image; and determining a user which is a target of the speech suggestion, based on a result of the detection.

The determining of the user which is the target of the speech suggestion includes: determining the user looking at the display inside the vehicle among the at least one user, as the user which is the target of the speech suggestion.

The determining of the user which is the target of the speech suggestion includes: determining a driver as the user which is the target of the speech suggestion, when two or more users looking at the display inside the vehicle exist among the at least one user and the driver is included in the two or more users.

The determining of the user which is the target of the speech suggestion includes: determining a driver as the user which is the target of the speech suggestion, when the user looking at the display inside the vehicle does not exist.

When a first user is determined as the user which is the target of the speech suggestion among the at least one user, and then the user looking at the display is changed from the first user to a second user, the determining of the user which is the target of the speech suggestion includes changing the user which is the target of the speech suggestion to the second user, when the change is maintained for more than a predetermined time period.

The method of suggesting a speech may further include determining a speech suggestion corresponding to the user determined as the target of the speech suggestion.

The determining of the speech suggestion includes determining at least one of content, a way of speaking, and an output location of the speech suggestion to correspond to the user determined as the target of the speech suggestion.

The determining of the speech suggestion includes determining the output location of the speech suggestion to correspond to a seating location of the user determined as the target of the speech suggestion.

The determining of the speech suggestion includes determining at least one of the content and the way of speaking of the speech suggestion to correspond to at least one of an age and a gender of the user determined as the target of the speech suggestion.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 6 is a table illustrating priorities among a plurality of users in a method of suggesting a speech according to an exemplary embodiment of the present disclosure;

FIG. 11 and FIG. 12 are flowcharts illustrating a method of suggesting a speech according to another exemplary embodiment of the present disclosure.

Figure 1:
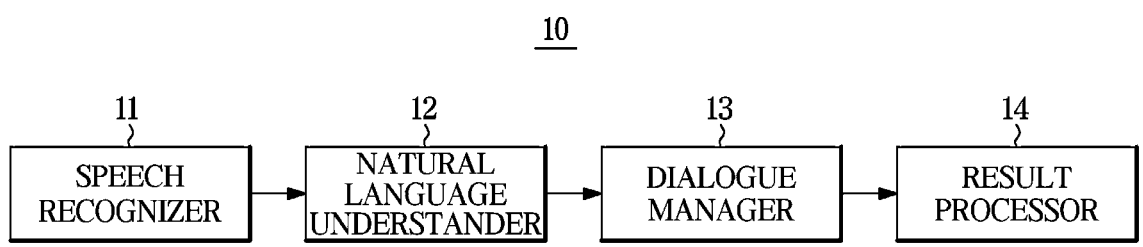
FIG. 1 is a control block diagram illustrating operations of a dialogue system installable in a vehicle.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The exemplary embodiments set forth herein and illustrated in the configuration of the present disclosure are only exemplary embodiments of the present disclosure, so it may be understood that they may be replaced with various equivalents and modifications at the time of the present disclosure.

Like reference numerals throughout the specification denote like elements.

Terminologies used herein are for describing various exemplary embodiments only and is not intended to limit the present disclosure. It is to be understood that the singular forms are intended to include the plural forms as well, unless the context clearly dictates otherwise. It will be further understood that the terms "include", "comprise" and/or "have" when used in the present specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. For example, without departing from the technical spirit or essential features of the present disclosure, a first element may be referred to as a second element, and also a second element may be referred to as a first element. Descriptions shall be understood as to include any and all combinations of one or more of the associated listed items when the items are described by use of the conjunctive term "~and/or~", or the like.

Furthermore, the terms such as "~part", "~device", "~block", "~member", "~module", and the like may refer to a unit of processing at least one function or act. For example, the terms may refer to at least process processed by at least one hardware, such as field-programmable gate array (FPGA)/application specific integrated circuit (ASIC), software stored in memories or processors.

Reference numerals used for method steps are just used for convenience of explanation, but not to limit an order of the steps. Thus, unless the context clearly dictates otherwise, the written order may be practiced otherwise.

Hereinafter, a method of suggesting a speech and a recording medium in which the method is recorded according to an aspect of the present disclosure will be described in detail with reference to the accompanying drawings.

Figure 2:
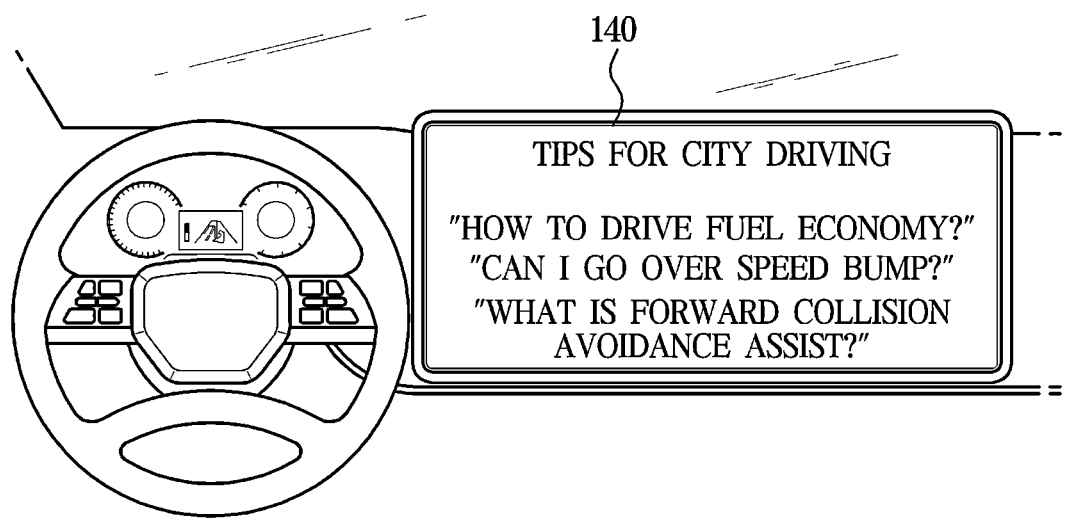
FIG. 2 is a diagram illustrating an example of a speech suggestion outputted through a display provided in a vehicle.

FIG. 1 is a control block diagram illustrating operations of a dialogue system installable in a vehicle. FIG. 2 is a diagram illustrating an example of a speech suggestion outputted through a display provided in a vehicle.

In the exemplary embodiments described below, the dialogue system refers to a system of recognizing and understanding a user's speech and providing a service corresponding to the user's speech.

The dialogue system mounted in the vehicle includes not only a case in which constituent components of the dialogue system are included in the vehicle, but also a case in which the dialogue system is connected to the vehicle through a network to recognize and understand the speech of the vehicle user and the vehicle user may use a service provided by the dialogue system.

Referring to FIG. 1, the dialogue system 10 may include a speech recognizer 11 to convert a user's speech into text, a natural language understander 12 to determine what is intended by the user's speech, a dialogue manager 13 to manage an overall conversation between the dialogue system 10 and the user, and a result processor 14 to perform processing for providing a result corresponding to the user intention.

The speech recognizer 11 may be implemented with a speech to text (STT) engine, and perform conversion into text by applying a speech recognition algorithm to the user's speech.

For example, the speech recognizer 11 may extract feature vectors from the user's speech by applying a feature vector extraction method such as a cepstrum, a linear predictive coefficient (LPC), a Mel frequency cepstral coefficient (MFCC), a filter bank energy, or the like.

Also, a recognition result may be obtained by comparing extracted feature vectors and trained reference patterns. To the present end, an acoustic model for modeling and comparing signal characteristics of voice or a language model for modeling a linguistic order of recognized vocabulary such as words or syllables may be used.

Furthermore, the speech recognizer 11 may convert the user's speech into text based on learning where machine learning or deep learning is applied.

The natural language understander 12 may apply a natural language understanding (NLU) technique to determine the user intention of the text. Accordingly, the natural language understander 12 may include an NLU engine that determine the user intention by applying the NLU technique to an input sentence.

For instance, the natural language understander 12 may recognize an entity name from the text. The entity name is a proper noun such as a name of an individual person, place, organization, time, day, currency, and the like. Named-entity recognition is for identifying an entity name in a sentence and classifying a type of the identified entity. A keyword may be extracted from the sentence through named-entity recognition to understand the meaning of the sentence.

Also, the natural language understander 12 may determine a domain from the text. The domain may be for identifying a subject of the user's speech. For example, domains representing various subjects such as schedule management, information related to weather or traffic conditions, text transmission, navigation, vehicle control, etc., may be determined based on the text.

Furthermore, the natural language understander 12 may analyze a speech act of the text. Speech act analysis is for analyzing an intention of speech, such as whether the user asks a question, makes a request, responds, or simply expresses the user's emotions.

The natural language understander 12 may determine an intent and an entity required to perform the intent based on the domain, entity name, speech act extracted from the text. For example, when the text is "turn on the air conditioner", the domain may be a [vehicle control], the intent may be [turn on, air conditioner], and also the entity required to perform control corresponding to such intent may be [temperature, air volume].

The user intention may be defined by values of the domain, intent, entity extracted from the text.

The dialogue manager 13 may manage overall dialogue between the user and the dialogue system 10. For instance, when failing to determine the intention of the user's speech, the dialogue manager 13 may continue a dialogue to determine the user intention, and when information required to perform control corresponding to the user intention is insufficient, the dialogue manager 13 may request required information to the user or vehicle. Furthermore, when the user's speech is related to a previous dialogue, the dialogue manager 13 may perform dialogue by referring to content of the previous dialogue.

The result processor 14 may perform processing for providing a service corresponding to the user intention. For example, when the service corresponding to the user intention is a vehicle-related control, the result processor 14 may generate a control signal for performing the corresponding control, and transmit the control signal to the vehicle.

Alternatively, when the service corresponding to the user intention is provision of specific information, the result processor 14 may search for the specific information and transmit the retrieved information to the vehicle. Information retrieval may be performed by an external server, in required.

Alternatively, when the service corresponding to the user intention is provision of specific content, the result processor 14 may request to an external server that provides the corresponding content.

Alternatively, when the service corresponding to the user intention is simply continuation of a dialogue, the result processor 14 may generate a response to the user's utterance and output the response as a voice.

The dialogue system 10 described above may be implemented with at least one memory storing a program performing the aforementioned operations and at least one processor implementing a stored program.

The constituent components of the dialogue system 10 are divided based on their operation or function, and all or a portion of the constituent components of the dialogue system 10 may share the memory or processor.

Also, the dialogue system 10 may be provided in an external server or vehicle, and some of the constituent components may be provided in the external server and the other constituent components may be provided in the vehicle.

In general, the user is required to utter first than the dialogue system 10 to use the dialogue system 10. In the present instance, the content of the user's utterance is required to be understandable and processable by the dialogue system 10.

However, the user is highly unlikely to recognize various services provided by the dialogue system 10 and an appropriate dialogue for each service. Accordingly, a method of suggesting a speech according to various exemplary embodiments of the present disclosure may induce an appropriate speech by providing the user of the vehicle with a speech suggestion.

In the method of suggesting a speech according to an exemplary embodiment of the present disclosure, as shown in FIG. 2, the speech suggestion may be provided as text through a display 140 provided in the vehicle. The speech suggestion may include at least one sentence.

For instance, when the vehicle is travelling in a downtown area, sample speeches for searching for information related to downtown driving, such as "how to drive fuel economy", "can I go over a speed bump?", and "what is the forward collision avoidance assist?", may be output on the display 140.

As described above, the method of suggesting a speech according to various exemplary embodiments of the present disclosure may output different speech suggestions depending on a current situation, that is, depending on a situation when the speech suggestion is output. For example, a speech suggestion suitable for a service available at the time of outputting the speech suggestion may be output.

Also, the method of suggesting a speech according to various exemplary embodiments of the present disclosure may provide a user customized speech suggestion by considering the user which is a target of speech suggestion, in outputting the speech suggestion. Hereinafter, a method of determining a target of speech suggestion is described in detail.

Figure 3:
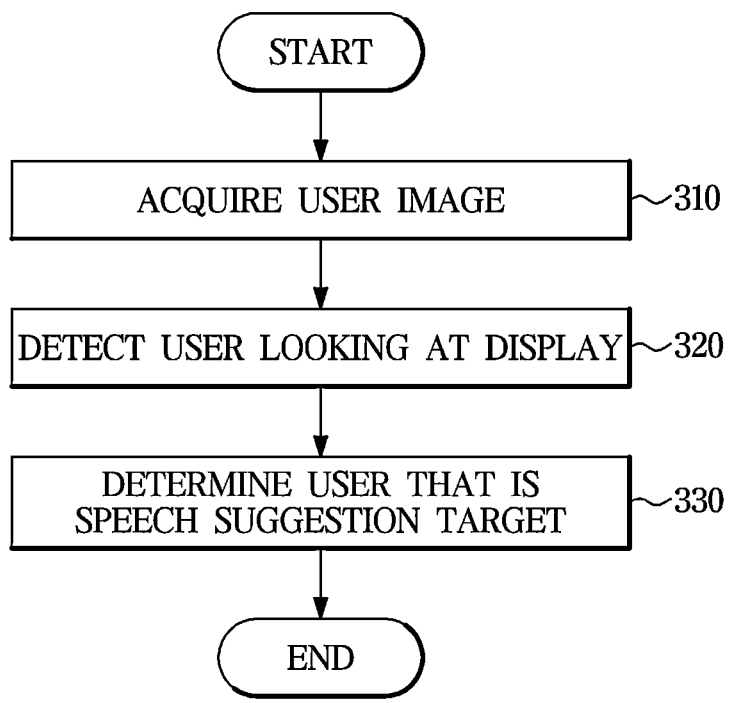
FIG. 3 is a flowchart illustrating a method of suggesting a speech according to an exemplary embodiment of the present disclosure.

FIG. 3 is a flowchart illustrating a method of suggesting a speech according to an exemplary embodiment of the present disclosure.

Referring to FIG. 3, the method of suggesting a speech according to an exemplary embodiment of the present disclosure includes obtaining a user image in which at least one user inside a vehicle is photographed (310), detecting a user looking at a display inside the vehicle based on the obtained user image (320), and determining a user which is a speech suggestion target among the at least one user based on a result of the detection (330).

The determination of the speech suggestion target described above may be performed when an output condition of determined speech suggestion is satisfied or at predetermined periods. The user which is a speech suggestion target could be referred as a target user.

For instance, when a predetermined time period has elapsed since the start of driving and the vehicle is not reproducing multimedia content, the output condition of speech suggestion for inducing reproduction of multimedia content may be satisfied.

As shown in FIG. 2, the speech suggestion may be output on the display 140 provided in the vehicle. Accordingly, the method of suggesting a speech according to various exemplary embodiments of the present disclosure may determine the user looking at the display 140 inside the vehicle as the user which is the speech suggestion target, may output the user customized speech suggestion.

Figure 4:
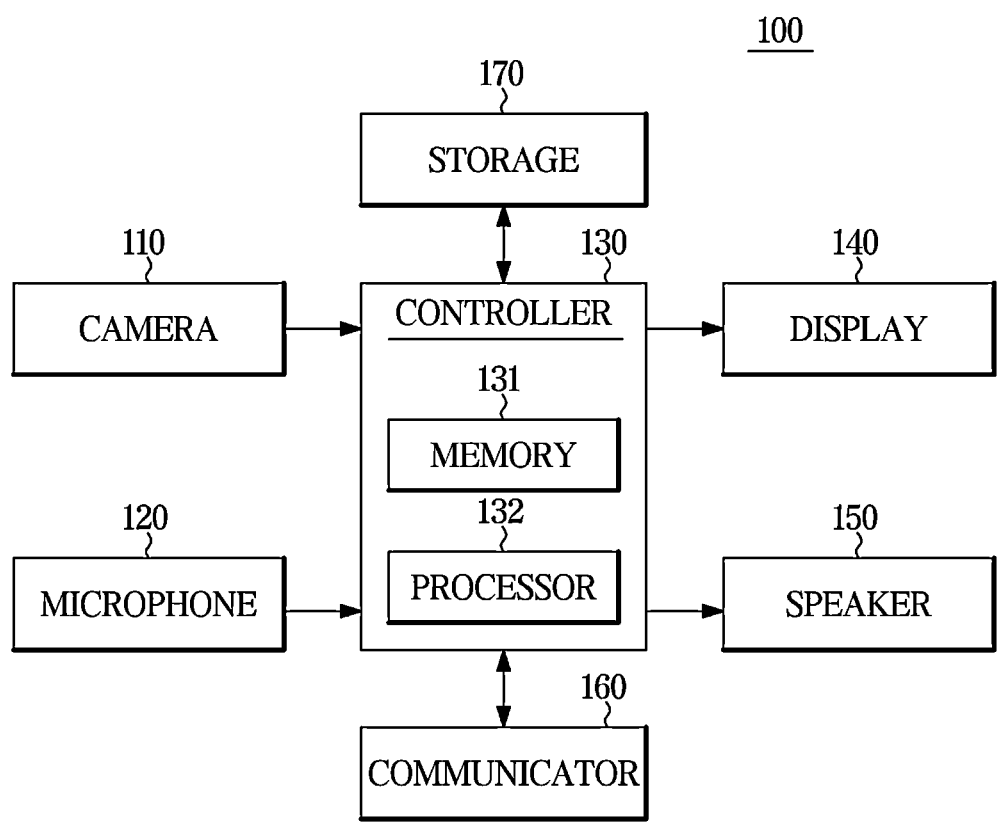
FIG. 4 is a control block diagram illustrating a vehicle used for performing a method of suggesting a speech according to an exemplary embodiment of the present disclosure.

FIG. 4 is a control block diagram illustrating a vehicle used for performing a method of suggesting a speech according to an exemplary embodiment of the present disclosure.

Referring to FIG. 4, a vehicle 100 may include a camera 110, a microphone 120, a display 140, a speaker 150, a communicator 160, a storage 170 and a controller 130. The camera 110 photographs a user inside the vehicle 100, and a user's speech is input through the microphone 120. The display 140 displays a speech suggestion, and the speaker 150 outputs a sound required for vehicle-related control or for providing a service desired by the user. The communicator 160 performs wireless communication with an external device. The storage 170 transitorily or non-transitorily stores information required for vehicle-related control or for providing a service desired by the user, and the controller 130 controls the above-described constituent components.

At least one camera 110 may be mounted on a location where the user in the vehicle 100 may be photographed. According to an exemplary embodiment of the present disclosure, the user includes both driver and passengers in the vehicle 100.

Alternatively, a mobile device provided with a camera may be connected to the vehicle 100 and performed as the camera 110 for photographing the user. The mobile device may be connected to the vehicle 100 through wireless communication such as Bluetooth or through a wired cable.

A user image photographed by the camera 110 may be processed by the controller 130 or transmitted to an external server through the communicator 160 depending on a subject that performs the method of suggesting a speech.

At least one microphone 120 may be mounted on a location where a speech of the user in the vehicle 100 may be input.

Alternatively, a mobile device provided with a microphone may be connected to the vehicle 100 and performed as the microphone 120 for receiving the user's speech.

The user's speech input into the microphone 120 may be processed by the controller 130 or transmitted to the external server through the communicator 160 depending on a subject that performs speech recognition.

The communicator 160 may transmit/receive information with an external device by applying at least one of various wireless communication methods such as Bluetooth, fourth generation (4G), fifth generation (5G) and Wi-Fi. For instance, the communicator 160 may communicate with a mobile device placed inside the vehicle 100 to receive information obtained by the mobile device or information stored in the mobile device (user image, user's speech, contact information, schedule, etc.), and may communicate with the external server to transmit the user's speech and receive information required for providing a service desired by the user.

As described above, the display 140 may display the speech suggestion. At least one of content, an output location and a way of speaking of the speech suggestion may differ depending on a speech suggestion target, which will be described in detail later.

Furthermore, the display 140 may display a navigation screen, multimedia content, information indicating a vehicle state, information for guiding a setting of the vehicle 100, and information related to driving.

For example, the display 140 may include an audio video navigation (AVN) display. However, the display 140 for displaying the speech suggestion is not limited to the AVN display, and thus any display positioned at a location where the user in the vehicle 100 may check what is displayed may be used as the display for displaying the speech suggestion.

The controller 130 may include at least one memory 131 storing a program for performing the operations to be described later and at least one processor 132 implementing a stored program.

The controller 130 may process the user image photographed by the camera 110 or the user's speech input into the microphone 120 directly, or transmit the user image or the user's speech to the external server through the communicator 160.

For instance, when processing the user's speech input into the microphone 120 directly, the controller 130 may perform all or a portion of the aforementioned operations of the dialogue system 10. That is, at least one of the speech recognizer 11, the natural language understander 12, the dialogue manager 13 and the result processor 14 may be included in the controller 130.

Furthermore, when the processing the user image photographed by the camera 110 directly, the controller 130 may detect a user looking at the display 140 from the photographed user image and determine the user looking at the display 140 as a user which is the speech suggestion target.

Although a type or position of the display 140 has not been limited herein, the display at which the user is looking and the display on which the speech suggestion is displayed are the same.

Figure 5:
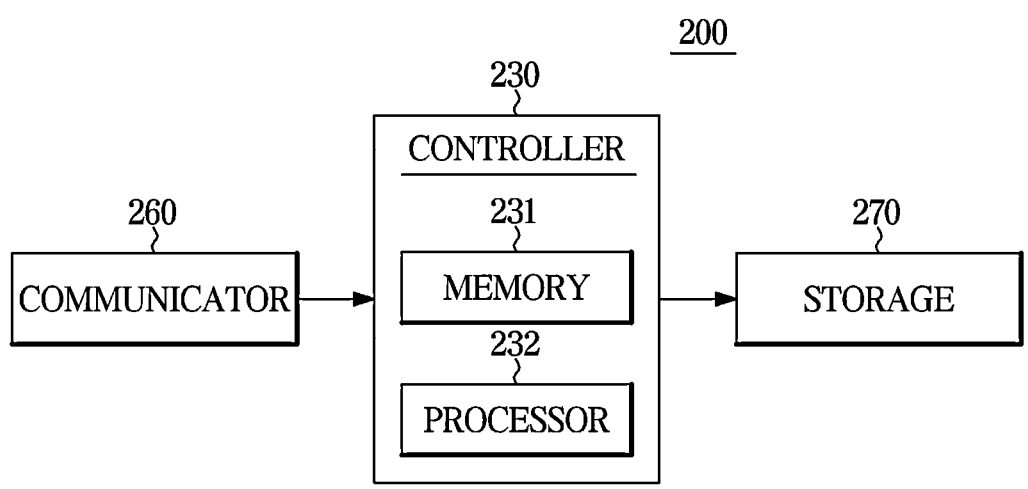
FIG. 5 is a control block diagram illustrating an external server including a dialogue system.

FIG. 5 is a control block diagram illustrating an external server including a dialogue system.

The all or a portion of the dialogue system 10 described above may be provided in the vehicle 100, but all or a portion thereof may be provided in a server 200, as described below.

Referring to FIG. 5, the server 200 may include a communicator 260 to communicate with another electronic device, a storage 270 to store various information required for functioning as the dialogue system 10 or information used to specify a user which is a speech suggestion target, and a controller 230.

The controller 230 may perform all or a portion of the above-described operations of the speech recognizer 11, the natural language understander 12, the dialogue manager 13 and the result processor 14. To the present end, a program for performing the aforementioned operations may be stored in at least one memory 231 and a stored program may be executed by at least one processor 232.

The communicator 260 may transmit/receive information by performing wireless communication with the vehicle 100. For instance, the communicator 260 may receive a user's speech from the vehicle 100 and transmit a result obtained by recognizing and processing the user's speech by the controller 230, that is, transmit a signal for providing a service corresponding to a user intention to the vehicle 100.

Meanwhile, a method of suggesting a speech according to various exemplary embodiments of the present disclosure may be performed by the server 200. In the instant case, the communicator 160 of the vehicle 100 may transmit the user image photographed by the camera 110 to the server 200, and the communicator 260 of the server 200 may receive the user image and transmit the user image to the controller 230.

The controller 230 may detect a user looking at the display 140 from the user image and determine the user looking at the display 140 as a user which is the speech suggestion target.

That is, the method of suggesting a speech according to various exemplary embodiments of the present disclosure may be performed by the vehicle 100 or the server 200. Alternatively, a portion of the method of suggesting a speech may be performed by the vehicle 100 and the other portion of the method of suggesting a speech may be performed by the server 200.

Meanwhile, when a plurality of users are in the vehicle 100, a user looking at the display 140 may be determined as the speech suggestion target among the plurality of users in the photographed user image. Hereinafter, priorities when no one in the vehicle 100 is looking at the display 140 and when a plurality of users looking at the display 140 exist are described.

FIG. 6 is a table illustrating priorities among a plurality of users in a method of suggesting a speech according to an exemplary embodiment of the present disclosure.

It may be estimated that a main user of the dialogue system 10 is a driver. Accordingly, priority may be provided to the driver in determining a user which is a speech suggestion target according to an exemplary embodiment of the method of suggesting a speech.

As shown in FIG. 6 as an exemplary embodiment of the present disclosure, when none of the occupants are looking at the display 140, that is, when any gaze looking at the display 140 is not detected in a user image, the driver may be determined as the user which is the speech suggestion target.

Furthermore, when both the driver and passenger (a passenger seat occupant or rear seat occupant) are looking at the display 140 simultaneously as well as when only the driver among a plurality of users is looking at the display 140, the driver may be determined as the user which is the speech suggestion target.

When only the passengers are looking at the display 140 without the driver looking at the display 140, priority may be provided to the passenger seat occupant.

Accordingly, when the passenger seat occupant and rear seat occupant are looking at the display 140 simultaneously, as well as when only the passenger seat occupant is looking at the display 140, the passenger seat occupant may be determined as the user which is the speech suggestion target.

The rear seat occupants do not have priorities, and when a left rear seat occupant and a right rear seat occupant are looking at the display 140 simultaneously, any occupant may be determined as the user which is the speech suggestion target.

Alternatively, priority may be arbitrarily provided to one of the left rear seat occupant and the right rear seat occupant.

The priorities of the occupants for each seat described above may be changed by the user or system. When changed by the system, the vehicle 100 or the server 200 may change priorities based on a frequency of use of the dialogue system 10 for each user.

Figure 7:
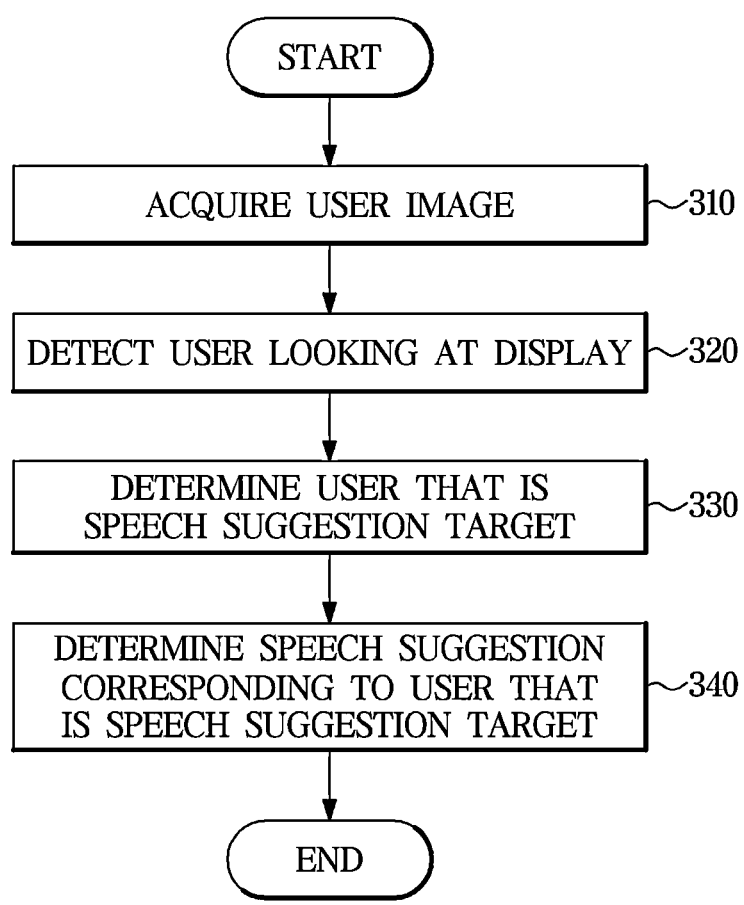
FIG. 7 is another flowchart illustrating a method of suggesting a speech according to an exemplary embodiment of the present disclosure.

FIG. 7 is another flowchart illustrating a method of suggesting a speech according to an exemplary embodiment of the present disclosure.

Referring to FIG. 7, the method of suggesting a speech according to various exemplary embodiments of the present disclosure may further include determining a speech suggestion corresponding to the user which is the speech suggestion target (340).

When the user which is speech suggestion target is determined according to the above-described operations, the controller 130 or 230 may determine at least one of content, a display location and a way of speaking of the speech suggestion suitable for the determined user.

To the present end, the determination of the speech suggestion may include obtaining information related to the user which is the speech suggestion target. The information related to the user may include information such as a seating location, gender, age group, and the like, of the user.

For example, the controller 130 or 230 may determine whether the user which is the speech suggestion target is a driver based on the user image photographed by the camera 110. For instance, when a seating location of the user looking at the display 140 corresponds to a driver's seat in the user image, the driver may be determined as the user which is the speech suggestion target. The controller 130 or 230 may determine the content or display location of the speech suggestion based on whether the user which is the speech suggestion target is the driver.

Hereinafter, operations of determining a display location of speech suggestion when the user which is the speech suggestion target is the driver are described.

Figure 8:
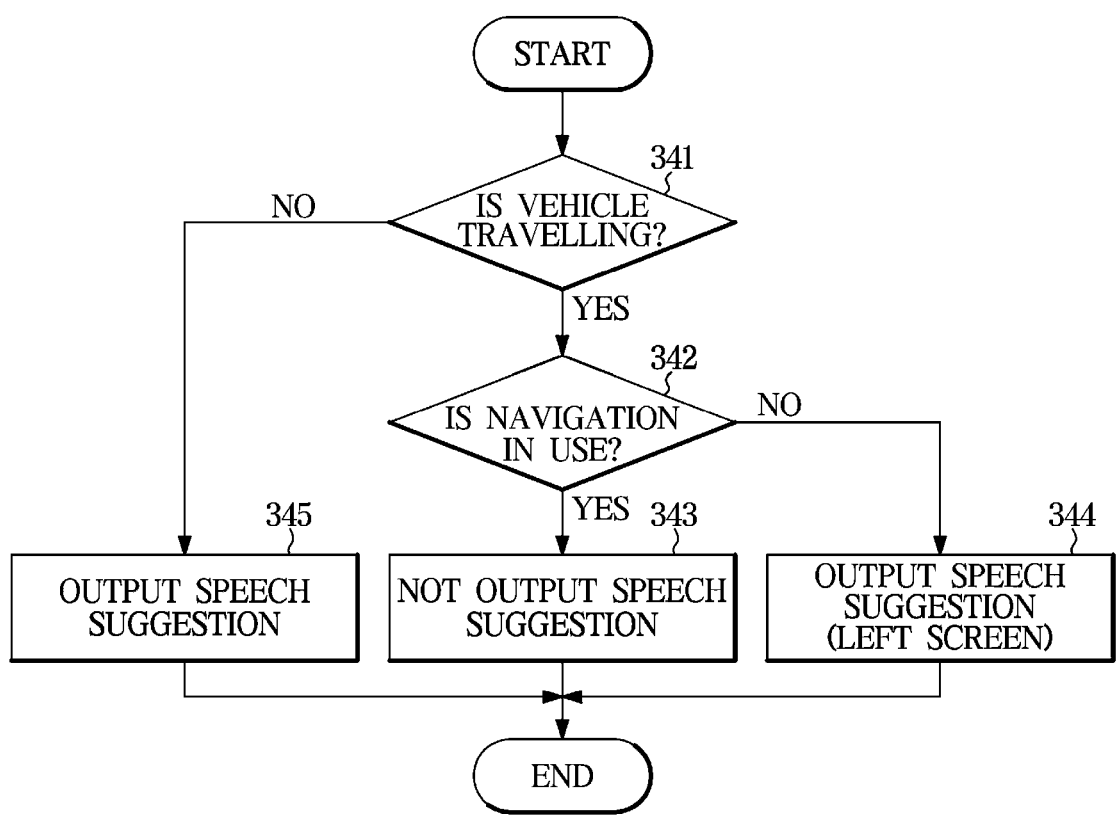
FIG. 8 is a flowchart illustrating operations of determining a display location of a speech suggestion when a user determined as a speech suggestion target is a driver, in a method of suggesting a speech according to an exemplary embodiment of the present disclosure.
Figure 9:
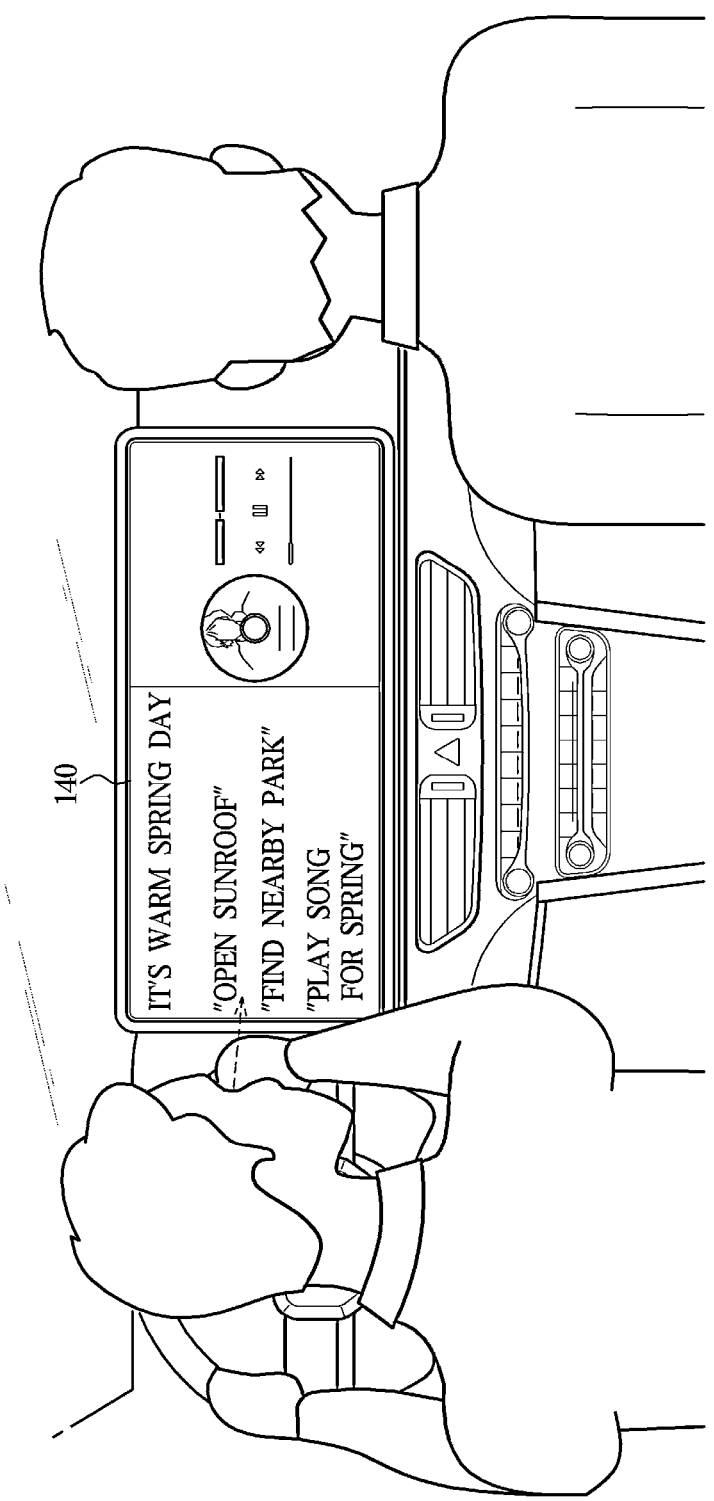
FIG. 9 and FIG. 10 are diagrams illustrating examples of display location of speech suggestion depending on a user determined as a speech suggestion target, in a method of suggesting a speech according to an exemplary embodiment of the present disclosure.
Figure 10:
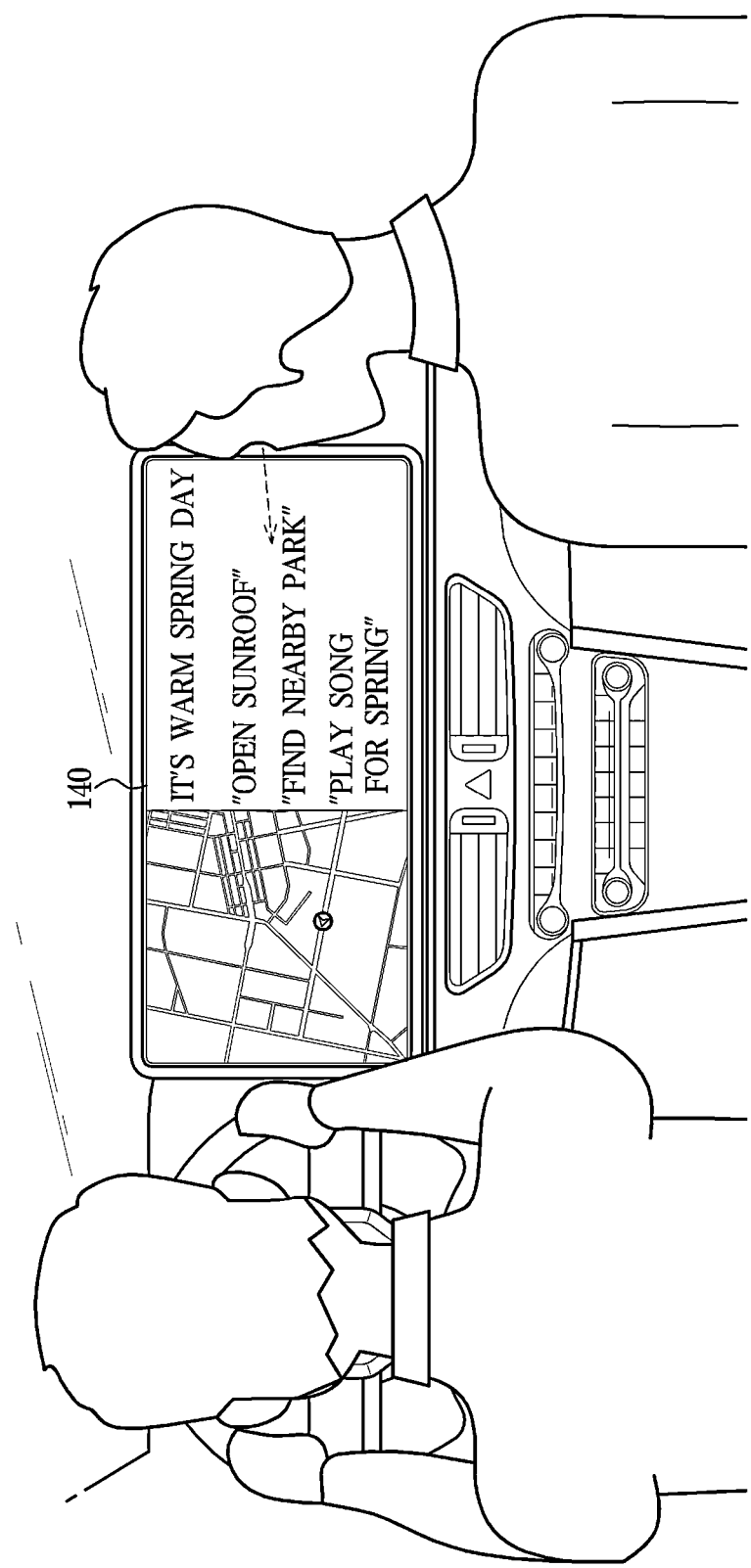

FIG. 8 is a flowchart illustrating operations of determining a display location of a speech suggestion when a user determined as a speech suggestion target is a driver, in a method of suggesting a speech according to an exemplary embodiment of the present disclosure. FIG. 9 and FIG. 10 are diagrams illustrating examples of display location of speech suggestion depending on a user determined as a speech suggestion target, in a method of suggesting a speech according to an exemplary embodiment of the present disclosure.

Referring to FIG. 8, whether the vehicle 100 is travelling is determined (341). When the vehicle 100 is travelling, whether a navigation is in use is determined (342). When the navigation is in use (Yes in operation 342), a speech suggestion is not output (343), may prevent a driver's attention from being distracted from the navigation.

When the navigation is not in use (No in operation 342), the speech suggestion may be displayed on a left screen of the display 140 (344). For example, as shown in FIG. 9, when a music playback screen is displayed on the display 140, the speech suggestion may be displayed on the left screen of the display 140 and the music playback screen may be displayed on a right screen of the display 140 by dividing a screen of the display 140 into two. In the present manner, the speech suggestion may be output while keeping providing previously provided information.

Here, outputting the speech suggestion on the left screen of the display 140 is for enabling the driver to check the speech suggestion displayed on the display 140 more easily, when a driver's seat is located on the left side thereof. Accordingly, an output location of the speech suggestion may differ in accordance with a location of the driver's seat.

When the vehicle 100 is not travelling (No in operation 341, being at a standstill), the speech suggestion may be displayed regardless of whether the navigation is in use. A display location of the speech suggestion may not be limited, and the speech suggestion may be displayed on the left screen of the display 140 even when the vehicle 100 is at a standstill.

When a user determined as a speech suggestion target is a passenger seat occupant, the speech suggestion may be displayed on the right screen of the display 140, as shown in FIG. 10.

Here, outputting the speech suggestion on the right screen of the display 140 is for enabling the passenger seat occupant to check the speech suggestion displayed on the display 140 more easily and continuing to provide information for the driver on the left screen of the display 140, when the driver's seat is located on the left side thereof. The output location of the speech suggestion may differ in accordance with the location of the driver's seat.

Meanwhile, the controller 130 or 230 may obtain information related to at least one of a gender or age group of the user which is the speech suggestion target from a user image. For instance, the controller 130 or 230 may determine whether the user which is the speech suggestion target is a male or a female, or whether the user which is the speech suggestion target is in his or her teens, twenties, thirties, forties, fifties, or more, by applying various image processing techniques to the user image.

Alternatively, the controller 130 or 230 may determine the gender or age group of the user which is the speech suggestion target by analyzing a user's voice input through the microphone 120. In the present instance, a currently speaking user may be determined based on a mouth shape shown in the user image, or determined by applying a speaker location recognition algorithm to the speaker's voice input into the microphone 120.

Alternatively, both the user image and user's voice may be used to determine the gender or age group of the user.

The controller 130 or 230 may determine at least one of content or a way of speaking of the speech suggestion to correspond to at least one of the gender or age group of the user which is the speech suggestion target.

The controller 130 or 230 may generate the speech suggestion using a way of speaking suitable for an age group of the user which is the speech suggestion target. Here, the way of speaking may be defined by a way of expression or used words. The way of speaking suitable for an age group may refer to a way of speaking preferred, familiar, or mainly used by a user of a corresponding age group.

For instance, when an age group of the user which is the speech suggestion target is determined to be a young age group such as his or her teens or twenties, the speech suggestion may be generated using a new word or buzzword.

The speech suggestion with ways of speaking suitable for age groups may be mapped and stored for each content in advance. The controller 130 or 230 may search for a speech suggestion of the way of speaking mapped to the age group of the user among the stored speech suggestions.

Also, the controller 130 or 230 may generate the speech suggestion including content suitable for the age group of the user which is the speech suggestion target. For example, when generating a speech suggestion related to music reproduction, the controller 130 or 230 may generate a speech suggestion that induces reproduction of music preferred by a user of a corresponding age group.

As an exemplary embodiment of the present disclosure, when generating a speech suggestion related to recommendation as to a restaurant or café, the controller 130 or 230 may generate a speech suggestion that induces recommendation about restaurants or cafés preferred by a user of a corresponding age group.

Likewise, the controller 130 or 230 may generate a speech suggestion using a way of speaking suitable for a gender of the user which is the speech suggestion target, or generate a speech suggestion including content suitable for the gender of the user which is the speech suggestion target.

Also, the gender or age group of the user may be considered even when outputting a system response to a user's speech in a text to speech (TTS). For instance, when the user is an aged group, the system response may be generated with respectful words, and when the user is a young age group, the system response may be generated with informal words.

Preference as to the way of speaking, place, content, etc., according to the gender or age group may be obtained by a variety of methods. For instance, dialogue analysis, navigation usage history analysis, multimedia content playback or search history analysis, and the like of male or female users of various age groups may be used.

Meanwhile, information related to user may be individually databased and stored in the storage 170 or 270. For example, a plurality of users may be registered for the vehicle 100, and information such as a gender and age group may be stored for each user.

Furthermore, information related to preference as to a way of speaking, place, multimedia content (music or movie), and the like, may be stored for each user. Such preference may be input by a user directly, or may be obtained by the controller 130 or 230 through an analysis on dialogue between a user and the dialogue system 10, navigation usage history analysis, multimedia content playback or search history analysis, and the like.

The information related to user may be stored by being assigned to a face identifier (ID) or a voice ID. That is, the user may be identified by the face ID or voice ID. When the face ID is used, a user may be identified by recognizing a face of the user in the user image photographed by the camera 110 and extracting features from the recognized face. When the voice ID is used, a user may be identified by extracting features from a voice of the user input into the microphone 120.

The controller 130 or 230 may identify the user which is the speech suggestion target using the face ID or voice ID, and search for information related to a corresponding user in the storage 170 or 270 and use the retrieved information to generate the speech suggestion. For instance, the controller 130 or 230 may generate the speech suggestion based on a gender or age group, or preference of the corresponding user.

Also, the storage 170 or 270 may store information related to vehicle-related knowledge level for each user. For example, the controller 130 or 230 may obtain the information related to vehicle-related knowledge level for each user, based on a user's speech history (e.g., a dialogue history between the corresponding user and the dialogue system 10, or a question history of the corresponding user) or a driving history of the corresponding user, and also may store the information related to vehicle-related knowledge level in the storage 170 or 270. For example, the controller 130 or 230 may determine that a user with a longer driving history has a higher level of knowledge about vehicle.

The controller 130 or 230 may consider a vehicle-related knowledge level of the user which is the speech suggestion target, when generating the speech suggestion.

When the user has a higher level of knowledge about vehicle than a predetermined level, vehicle-related terms may be displayed as abbreviations considering the limited number of displayable characters. Also, a speech suggestion related to advanced functions of vehicle may be generated.

For instance, when a user has previously asked a question about the definition of a smart cruise control (SCC), the abbreviation for smart cruise control, SCC, may be displayed without generating a speech suggestion related to the definition of SCC. Also, a speech suggestion related to the SCC may be generated.

By contrast, when the user has a lower level of knowledge about vehicle than a predetermined level, vehicle-related terms may be displayed as full forms. Also, a speech suggestion related to basic functions of vehicle may be generated.

For example, when a user has not asked a question about the SCC, a speech suggestion related to the definition of the SCC may be generated to the user.

Meanwhile, the number of displayable characters may be limited in accordance with a size of display or a size of area where the speech suggestion is displayed. According to an exemplary embodiment of the present disclosure, the number of displayable characters may be set according to a user's preference within a limited range. For example, when the user does not prefer displaying many characters, the number of characters may be reduced but a size of the characters may be increased. Such setting may be made by a user, and also when a setting history is accumulated, the controller 130 or 230 may automatically set the number of displayable characters based on the setting history.

Meanwhile, according to an exemplary embodiment of the present disclosure, when it is determined that the user sufficiently learns a suggested speech, the method of suggesting a speech may output a new speech suggestion instead of the same speech suggestion. For example, when the user utters a suggested speech N or more number of times (N is an integer greater than or equal to 1), it may be determined that learning has been sufficiently achieved.

Also, according to an exemplary embodiment of the present disclosure, when it is determined that the user does not satisfy a suggested speech, the method of suggesting a speech may output a new speech suggestion instead of the same speech suggestion. For example, when the user utters a suggested speech less than M number of times (M is an integer greater than or equal to 1) during a predetermined period, or when the user utters the suggested speech less than X % (the number of utterances compared to the number of speech suggestion outputs), it may be determined that the user does not satisfy the suggested speech.

The number of utterances may be stored in the storage 170 or 270 for each user, and whether utterance is made for each user may be identified by the face ID or voice ID.

When a user looking at the display 140 is changed, a speech suggestion target may be changed accordingly. That is, according to the change in the user looking at the display 140, content, a way of speaking or display location of speech suggestion may be changed.

However, since a frequent screen change may interfere with driving, it may be limited that the speech suggestion target is changed only when the change in user is maintained for more than a predetermined reference time period.

For example, the following description is made with assumption that a first user is looking at the display 140 and is determined as the speech suggestion target among the first user and a second user inside the vehicle 100.

The controller 130 or 230 may generate a speech suggestion including a way of speaking or content suitable for the first user. The display 140 of the vehicle 100 may display the generated speech suggestion on a location corresponding to the first user.

When a predetermined time period arrives or an output condition of new speech suggestion is satisfied, the controller 130 or 230 may determine a user which is a speech suggestion target again. In the present instance, when the second user and not the first user, is looking at the display 140, the controller 130 or 230 may change the speech suggestion target from the first user to the second user, only when a time period during which the second user is looking at the display 140 is maintained for a predetermined reference time period.

Meanwhile, according to another exemplary embodiment of the method of suggesting a speech, the user which is the speech suggestion target may be determined depending on a seating location, which is described in detail below with reference to FIG. 11 and FIG. 12.

Figure 11:
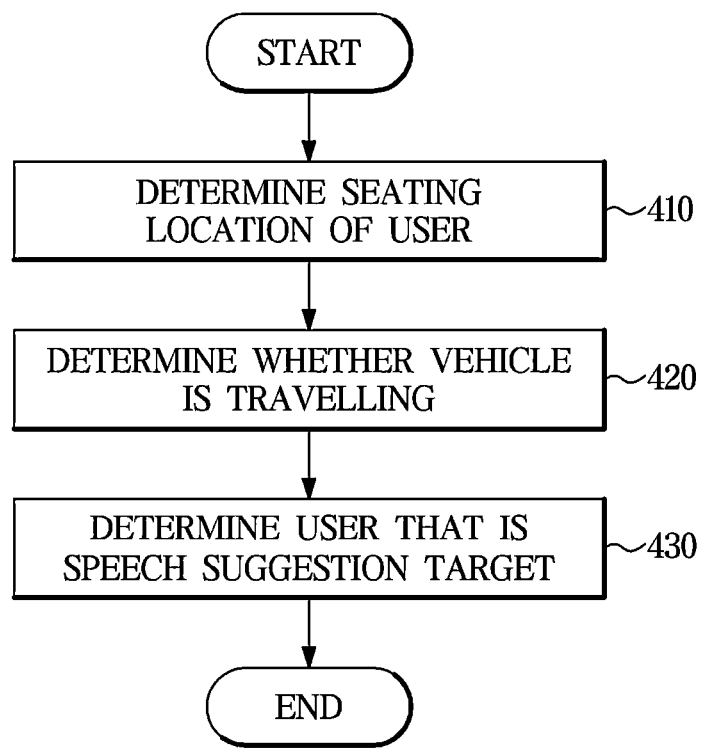

FIG. 11 and FIG. 12 are flowcharts illustrating a method of suggesting a speech according to another exemplary embodiment of the present disclosure.

Referring to FIG. 11, the method of suggesting a speech according to another exemplary embodiment includes determining a seating location of at least one user inside a vehicle (410), determining whether the vehicle is travelling (420), and determining a user which is a speech suggestion target, based on the determined seating location and the determination on whether the vehicle is travelling (430).

The method of suggesting a speech according to another exemplary embodiment of the present disclosure may be performed by at least one of the vehicle 100 or the server 200, and a speech suggestion may be displayed on the display 140 provided in the vehicle 100.

The vehicle 100 used in the method of suggesting a speech according to another exemplary embodiment of the present disclosure may not include the camera 110. That is, the vehicle 100 without the camera 110 may be used to perform the method of suggesting a speech according to another exemplary embodiment of the present disclosure.

Meanwhile, the vehicle 100 may include a seat sensor which is configured to detect whether a user is accommodated for each seat. The seat sensor may be implemented as a pressure sensor or a weight sensor, and the controller 130 may determine whether the user is accommodated on a corresponding seat based on an output of the seat sensor and use a result of the determination for control of the vehicle 100. For example, when it is determined that a user is seated on a passenger seat but does not wear a seat belt, a warning sound that induces the wearing of the seat belt may be output through the speaker 150.

Also, the controller 130 or 230 may use the output of the seat sensor to determine the speech suggestion target, like the exemplary embodiment described above.

Referring to FIG. 12, as a result of determining the seating location based on the output of the seat sensor, when only driver is in the vehicle 100 (Yes in operation 410), the vehicle 100 is travelling (Yes in operation 420) and a navigation is in use (Yes in operation 441), the speech suggestion is not output (442). Accordingly, a driver's attention may be prevented from being distracted from the navigation.

When the driver is driving the vehicle 100 without using the navigation (No in operation 441), the driver may be determined as the speech suggestion target and the speech suggestion may be output on a left screen of the display 140 (445). For example, as shown in FIG. 9, when a music playback screen is displayed on the display 140, the speech suggestion may be displayed on the left screen of the display 140 and the music playback screen may be displayed on the right screen of the display 140 by dividing a screen of the display 140 into two. In the present manner, the speech suggestion may be output while keeping providing previously provided information.

When only driver is in the vehicle 100 (Yes in operation 410) and the vehicle 100 is at a standstill (No in operation 420), the driver may be determined as the speech suggestion target and the speech suggestion may be output (443). That is, when the vehicle 100 is at a standstill, the speech suggestion may be output regardless of whether the navigation is in use. A display location of the speech suggestion may not be limited, and the speech suggestion may be displayed on the left screen of the display 140 even when the vehicle 100 is at a standstill.

As a result of determination on the seating location, when the driver and passenger seat occupant are in the vehicle 100 (No in operation 410) and the vehicle 100 is travelling (Yes in operation 420'), the passenger seat occupant may be determined as the speech suggestion target and the speech suggestion may be output on a right screen of the display 140 (444).

When the vehicle 100 is at a standstill (No in operation 420'), the driver may be determined as the speech suggestion target and the speech suggestion may be output on the left screen of the display 140 (445).

The output location of the speech suggestion on the display 140 according to the speech suggestion target may differ depending on a location of the driver's seat. Accordingly, when the driver is the speech suggestion target in a vehicle including a driver's seat on a right side, the speech suggestion may be displayed on the right screen of the display 140.

As is apparent from the above, according to the exemplary embodiments of the present disclosure, the method of suggesting a speech and a recording medium can suggest an appropriate speech by determining a speech suggestion target using various information that a vehicle may obtain.

Also, the method of suggesting a speech and the recording medium can determine content, a way of speaking, an output location, etc., of the speech suggestion depending on a user determined as the speech suggestion target and a current situation, can provide a customized speech suggestion for the user and minimize an effect of speech suggestion output on driving of the vehicle.

Embodiments can thus be implemented through computer readable code/instructions in/on a medium, e.g., a non-transitory computer readable medium, to control at least one processing element to implement any above described exemplary embodiment of the present disclosure. The medium can correspond to any medium/media permitting the storing and/or transmission of the computer readable code.

The computer-readable code may be recorded on a medium or transmitted through the Internet. The medium may include read only memory (ROM), random access memory (RAM), magnetic tapes, magnetic disks, flash memories, and optical recording medium.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of suggesting a speech that provides a speech suggestion to a user inside a vehicle, the method comprising:
    obtaining a user image where at least one user inside the vehicle is photographed;
    detecting a user looking at a display inside the vehicle among the at least one user, based on the obtained user image;
    determining, by a processor, a target user which is a target of the speech suggestion, based on a result of the detection; and
    determining, by the processor, the speech suggestion corresponding to the target user, wherein the determining of the speech suggestion includes determining at least one of content, a way of speaking, or an output location of the speech suggestion to correspond to the target user.

2. The method of claim 1, wherein the determining of the target user includes determining the user looking at the display inside the vehicle among the at least one user, as the target user.

3. The method of claim 2, wherein the determining of the target user further includes determining a driver as the target user, when two or more users looking at the display inside the vehicle exist among the at least one user and the driver is included in the two or more users.

4. The method of claim 2, wherein the determining of the target user further includes determining a driver as the target user, when the user looking at the display inside the vehicle does not exist.

5. The method of claim 2, wherein, when a first user is determined as the target user among the at least one user, and then the user looking at the display is changed from the first user to a second user, the determining of the target user further includes changing the target user of the speech suggestion to the second user, when the second user keeps looking at the display for more than a predetermined time period.

6. The method of claim 1, wherein the determining of the speech suggestion includes determining the output location of the speech suggestion to correspond to a seating location of the target user.

7. The method of claim 1, wherein the determining of the speech suggestion includes determining at least one of the content and the way of speaking of the speech suggestion to correspond to at least one of an age and a gender of the target user.

8. The method of claim 1, further including:
    storing a preference related to at least one of the content and the way of speaking of the speech suggestion for each user,
    wherein the determining of the speech suggestion further includes:
    identifying the target user; and
    determining the at least one of the content and the way of speaking of the speech suggestion, based on the stored preference of the identified target user.

9. The method of claim 1, wherein the determining of the speech suggestion further includes:
    identifying the target user; and
    determining the content of the speech suggestion based on a vehicle-related knowledge level of the identified target user.

10. The method of claim 9, further including:
    storing a speech history or a driving history for each user; and
    determining the vehicle-related knowledge level based on the stored speech history or the stored driving history.

11. A non-transitory computer-readable recording medium storing a program for implementing a method of suggesting a speech that provides a speech suggestion to a user inside a vehicle, the method comprising:
    obtaining a user image where at least one user inside the vehicle is photographed;
    detecting a user looking at a display inside the vehicle among the at least one user, based on the obtained user image;
    determining, by a processor, a target user which is a target of the speech suggestion, based on a result of the detecting; and determining the speech suggestion corresponding to the target user, wherein the determining of the speech suggestion includes determining at least one of content, a way of speaking, or an output location of the speech suggestion to correspond to the target user.

12. The non-transitory computer-readable recording medium of claim 11, wherein the determining of the target user includes:
determining the user looking at the display inside the vehicle among the at least one user, as the target user.

13. The non-transitory computer-readable recording medium of claim 12, wherein the determining of the target user includes:
determining a driver as the target user, when two or more users looking at the display inside the vehicle exist among the at least one user and the driver is provided in the two or more users.

14. The non-transitory computer-readable recording medium of claim 12, wherein the determining of the target user includes:
determining a driver as the target user, when the user looking at the display inside the vehicle does not exist.

* * * * *